United States Patent
Sato et al.

(10) Patent No.: US 7,950,013 B2
(45) Date of Patent: May 24, 2011

(54) SYSTEM FOR MONITORING TIME PROPORTION FOR INTERRUPT OR TASK PROCESSING WITH RESTRICTION PLACED IN SUBSEQUENT MONITORING TIME PERIOD WHEN ALLOWABLE TIME PROPORTION IS EXCEED

(75) Inventors: Nakaba Sato, Odawara (JP); Toshiaki Terao, Odawara (JP); Hiroji Shibuya, Odawara (JP)

(73) Assignee: Hitachi, Ltd., Tokyo (JP)

( * ) Notice: Subject to any disclaimer, the term of this patent is extended or adjusted under 35 U.S.C. 154(b) by 1417 days.

(21) Appl. No.: 11/407,972

(22) Filed: Apr. 21, 2006

(65) Prior Publication Data
US 2007/0209037 A1 Sep. 6, 2007

(30) Foreign Application Priority Data
Mar. 2, 2006 (JP) .................................. 2006-056520

(51) Int. Cl.
 G06F 9/46 (2006.01)
 G06F 13/24 (2006.01)
 G06F 13/26 (2006.01)
(52) U.S. Cl. ......... 718/102; 718/100; 718/103; 718/104; 718/108; 710/260; 710/262; 710/264; 710/266
(58) Field of Classification Search .................. None
See application file for complete search history.

(56) References Cited

U.S. PATENT DOCUMENTS

| | | | | |
|---|---|---|---|---|
| 5,542,076 A * | 7/1996 | Benson et al. | ................. | 710/260 |
| 6,092,095 A * | 7/2000 | Maytal | ........................... | 718/100 |
| 6,308,316 B1 * | 10/2001 | Hashimoto et al. | .......... | 717/127 |
| 6,430,594 B1 * | 8/2002 | Akiyama et al. | .............. | 718/108 |
| 6,467,008 B1 * | 10/2002 | Gentry et al. | ................. | 710/261 |
| 6,633,942 B1 * | 10/2003 | Balasubramanian | ......... | 710/264 |
| 6,754,690 B2 * | 6/2004 | Larson | .......................... | 718/102 |
| 7,120,717 B2 * | 10/2006 | Vu | ................................. | 710/262 |
| 7,124,225 B2 * | 10/2006 | Yao | ............................... | 710/266 |
| 7,136,970 B2 | 11/2006 | Yoshiya et al. | | |
| 7,275,122 B2 * | 9/2007 | Wright et al. | ................. | 710/267 |
| 7,444,450 B2 * | 10/2008 | Wright et al. | ................. | 710/264 |
| 7,484,214 B2 * | 1/2009 | Tsunedomi et al. | .......... | 718/101 |
| 7,581,052 B1 * | 8/2009 | Solomita | ....................... | 710/267 |
| 7,634,589 B2 * | 12/2009 | Anand et al. | .................... | 710/15 |
| 7,831,980 B2 * | 11/2010 | Accapadi et al. | ............. | 718/108 |
| 2004/0133707 A1 | 7/2004 | Yoshiya et al. | | |
| 2005/0114286 A1 | 5/2005 | Bai et al. | | |

FOREIGN PATENT DOCUMENTS

| | | |
|---|---|---|
| JP | 09-185516 | 7/1997 |
| JP | 11-065623 | 3/1999 |

(Continued)

OTHER PUBLICATIONS

Partial English translation of Office Action in Japanese Patent Application No. 2006-056520, dated Jul. 14, 2010.

(Continued)

Primary Examiner — Meng-Ai An
Assistant Examiner — Abdullah Al Kawsar
(74) Attorney, Agent, or Firm — Brundidge & Stanger, P.C.

(57) ABSTRACT

A storage system has a single processor that operates in a multitasking operating system environment. An operation time manager adjusts the balance between processing time proportions for interrupt processing and task processing requested of the storage system internally and externally so that those processing time proportions become within respective predetermined ranges.

5 Claims, 14 Drawing Sheets

FOREIGN PATENT DOCUMENTS

| | | |
|---|---|---|
| JP | 2918297 | 4/1999 |
| JP | 2000-155695 | 6/2000 |
| JP | 2001-337841 | 12/2001 |
| JP | 2004-206623 | 7/2004 |

OTHER PUBLICATIONS

Notice of Reasons for Rejection in Japanese Application No. 2006-056520 mailed Feb. 22, 2011 with partial English translation.

* cited by examiner

FIG.3

| SYSTEM | CONTROL PROCESSING | TASK PROCESSING | INTERRUPT PROCESSING |
|---|---|---|---|
| MAIN I/O | HOST DATA TRANSFER CONTROL<br>CACHE CONTROL<br>POOL MANAGEMENT<br>DIRECTORY CONFIGURATION CHANGE | tDFCTL | INTER-CONTROLLER COMMUNICATION INTERRUPT<br>I2C INTERRUPT |
| MONITORING | OFF-LINE MONITORING<br>ON-LINE VERIFICATION<br>BACKEND MONITORING | tDFCTL | |
| FAILURE | DRIVE RECOVERY<br>MONITOR DESTAGE | tSysCtlTask<br>tSYSDWNTask | DC VOLTAGE DEFECT<br>OFFREQ TIME-OUT |
| NETWORK | SNMP PROCESSING<br>SNTP PROCESSING<br>WEB CONTROL | tSNMPTask<br>tSNTPTask<br>tHTTPTask | LAN-RX |
| OS | OS COMMON CONTROL | tRootTask | |

FIG.5

OPERATION TIME ALLOCATION RANGE TABLE

| MAIN I/O | | MONITORING | | FAILURE | | NETWORK | | OS |
|---|---|---|---|---|---|---|---|---|
| TASK PROCE-SSING | INTERRUPT PROCE-SSING | TASK PROCE-SSING | INTERRUPT PROCE-SSING | TASK PROCE-SSING | INTERRUPT PROCE-SSING | TASK PROCE-SSING | INTERRUPT PROCE-SSING | |
| — | 0%~80% | 0%~50% | — | — | — | 0%~50% | 0%~20% | — |

800

NORMAL STATE OPERATION TIME ALLOCATION TABLE 810

| MAIN I/O | | MONITORING | | FAILURE | | NETWORK | | OS |
|---|---|---|---|---|---|---|---|---|
| TASK PROCE-SSING | INTERRUPT PROCE-SSING | TASK PROCE-SSING | INTERRUPT PROCE-SSING | TASK PROCE-SSING | INTERRUPT PROCE-SSING | TASK PROCE-SSING | INTERRUPT PROCE-SSING | |
| — | THRESHOLD VALUE 40% | THRESHOLD VALUE 25% | — | — | — | THRESHOLD VALUE 25% | THRESHOLD VALUE 10% | — |

FIG. 7

RESTRICTED STATE OPERATION TIME ALLOCATION TABLE 820

| RESTRICTED STATE | MAIN I/O | | MONITORING | | FAILURE | | NETWORK | | OS |
|---|---|---|---|---|---|---|---|---|---|
| | TASK PROCE-SSING | INTERRUPT PROCE-SSING | TASK PROCE-SSING | INTERRUPT PROCE-SSING | TASK PROCE-SSING | INTERRUPT PROCE-SSING | TASK PROCE-SSING | INTERRUPT PROCE-SSING | |
| RESTRICTED STATE 1 | — | THRESHOLD VALUE 40% | — | — | — | — | — | THRESHOLD VALUE 10% | — |
| RESTRICTED STATE 2 | — | — | — | — | — | — | THRESHOLD VALUE 25% | — | — |
| RESTRICTED STATE 3 | — | — | THRESHOLD VALUE 25% | — | — | — | THRESHOLD VALUE 25% | THRESHOLD VALUE 10% | — |
| RESTRICTED STATE 4 | — | — | THRESHOLD VALUE 25% | — | — | — | — | — | — |
| RESTRICTED STATE 5 | — | — | THRESHOLD VALUE 25% | — | — | — | THRESHOLD VALUE 25% | THRESHOLD VALUE 10% | — |
| RESTRICTED STATE 6 | — | — | — | — | — | — | THRESHOLD VALUE 25% | — | — |
| RESTRICTED STATE 7 | — | — | THRESHOLD VALUE 21% | — | — | — | THRESHOLD VALUE 21% | THRESHOLD VALUE 8% | — |
| RESTRICTED STATE 8 | — | THRESHOLD VALUE 40% | — | — | — | — | — | THRESHOLD VALUE 10% | — |
| RESTRICTED STATE 9 | — | THRESHOLD VALUE 31% | — | — | — | — | — | — | — |
| RESTRICTED STATE 10 | — | THRESHOLD VALUE 28% | — | — | — | — | — | — | — |
| RESTRICTED STATE 11 | — | THRESHOLD VALUE 31% | THRESHOLD VALUE 19% | — | — | — | THRESHOLD VALUE 19% | THRESHOLD VALUE 6% | — |
| RESTRICTED STATE 12 | — | THRESHOLD VALUE 28% | THRESHOLD VALUE 16% | — | — | — | THRESHOLD VALUE 16% | — | — |
| RESTRICTED STATE 13 | — | THRESHOLD VALUE 24% | THRESHOLD VALUE 13% | — | — | — | THRESHOLD VALUE 13% | THRESHOLD VALUE 6% | — |
| RESTRICTED STATE 14 | — | THRESHOLD VALUE 21% | THRESHOLD VALUE 12% | — | — | — | THRESHOLD VALUE 12% | THRESHOLD VALUE 5% | — |

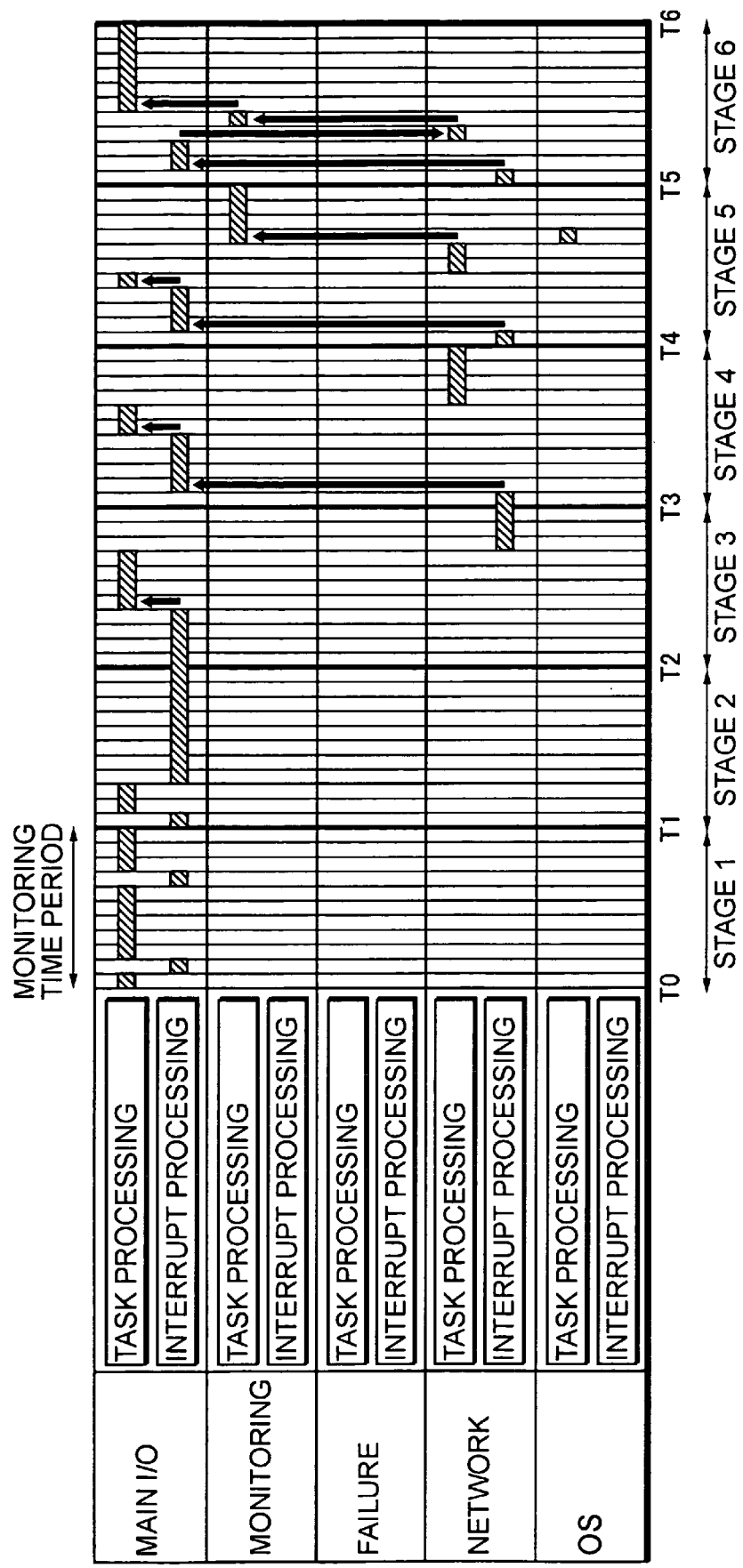

FIG. 10

| SYSTEM | CONTROL PROCESSING | \multicolumn{15}{c|}{RESTRICTED STATE} |
|---|---|---|---|---|---|---|---|---|---|---|---|---|---|---|---|---|

| SYSTEM | CONTROL PROCESSING | 1 | 2 | 3 | 4 | 5 | 6 | 7 | 8 | 9 | 10 | 11 | 12 | 13 | 14 | 15 |
|---|---|---|---|---|---|---|---|---|---|---|---|---|---|---|---|---|
| MAIN I/O | HOST DATA TRANSFER CONTROL | O | O | O | O | O | O | O | O | O | O | O | O | O | O | O |
| | CACHE CONTROL | O | O | O | O | O | O | O | O | O | O | O | O | O | O | O |
| | POOL MANAGEMENT | O | O | O | O | O | O | O | O | O | O | O | O | × | × | × |
| | DIRECTORY CONFIGURATION CHANGE | O | O | O | O | O | O | O | O | O | × | × | × | × | × | × |
| MONITORING | OFF-LINE MONITORING | O | O | O | O | O | O | O | × | × | × | × | × | × | × | O |
| | ON-LINE VERIFICATION | O | O | O | O | O | × | O | O | O | O | O | O | O | O | O |
| | BACKEND MONITORING | O | O | O | O | × | O | O | O | O | O | O | O | × | × | × |
| FAILURE | DRIVE RECOVERY | O | O | × | O | O | O | O | O | O | O | O | O | O | O | O |
| | URGENT DESTAGE | O | O | O | O | O | O | O | O | O | O | O | O | O | O | O |
| NETWORK | SNMP CONTROL | O | O | O | O | O | O | × | O | O | O | O | O | O | O | O |
| | SNTP CONTROL | O | O | O | O | O | O | × | O | × | O | O | O | O | O | × |
| | WEB CONTROL | × | O | O | O | O | O | O | O | O | O | × | O | × | × | × |
| OS | OS COMMON CONTROL | O | O | O | O | O | O | O | O | O | O | O | O | O | O | O |

SYSTEM FOR MONITORING TIME PROPORTION FOR INTERRUPT OR TASK PROCESSING WITH RESTRICTION PLACED IN SUBSEQUENT MONITORING TIME PERIOD WHEN ALLOWABLE TIME PROPORTION IS EXCEED

CROSS-REFERENCES TO RELATED APPLICATIONS

This application relates to and claims priority from Japanese Patent Application No. 2006-56520, filed on Mar. 2, 2006, the entire disclosure of which is incorporated herein by reference.

BACKGROUND

The present invention relates to a storage system and scheduling method that adjusts the balance between processing time for task processing, and interrupt processing requested internally or externally.

In a database system such as a data center, that manages a large volume of data, data is managed by using a storage system such as a disk array system. A disk array system has a number of storage devices arranged in arrays, and provides storage resources in RAID (Redundant Arrays of Independent Inexpensive Disks) form to a host computer. The host computer and storage system are mutually connected via a device-sharing network such as a SAN (Storage Area Network).

The network-connected storage system executes not only processing requested internally, including recovery processing for recovering any failure occurring in the disk drives, self-diagnosis processing for checking whether or not a failure is present in any disk drives, and backup processing for backing up data, but also processing requested externally, including access from a host computer and various network servers.

Of the processing requested internally and externally, processing that needs a real-time response (readiness) has to be performed promptly, and efficient scheduling is necessary. For example, Japanese Patent No. 2918297 proposes an interruption control method for temporarily stopping non-interrupt-level processing and executing interrupt-level processing when that interrupt-level processing is requested.

SUMMARY

In network-connected storage systems, one that has only one processor and aims at low cost and high performance is being developed. In a storage system that processes both I/O requests from a host computer and access from various network servers in a multitasking operating system environment that operates on a single processor, when there are many high priority requests (hereinafter referred to as "specific commands"), most of the processor resources are assigned to those specific commands. As a result, barely any processor resources can be assigned to normal commands. The above problem occurs because, although a task scheduler schedules task processing, it does not schedule all processing including both interrupt processing and task processing. Improvement on that problem has been desired to prevent deterioration in the storage system performance.

Accordingly, an object of the present invention is to solve the above problem by scheduling not only task processing, but all processing, including high priority processing, in a multitasking operating system environment that operates on a single processor.

To achieve the above object, a storage system according to the present invention has a single processor that operates in a multitasking operating system environment. The storage system includes an operation time manager that adjusts the balance of the ratio between interrupt processing time and task processing time to keep the processing time ratio between interrupt processing and task processing requested internally or externally within a predetermined range.

When the proportion of interrupt processing time in a certain monitoring time period exceeds a predetermined range, the operation time manager restricts interrupt processing in the subsequent monitoring time period. Meanwhile, when the proportion of interrupt processing time to certain monitoring time period is within a predetermined range, the restriction on interrupt processing is cancelled in the subsequent monitoring time period. In other words, the operation time manager restricts interrupt processing or cancels that restriction every monitoring time period according to the storage system workload.

When the proportion of task processing time in a certain monitoring time period exceeds a predetermined range, the operation time manager restricts task processing in the subsequent monitoring time period. Meanwhile, when the proportion of task processing time in a certain monitoring time period is within a predetermined range, the restriction to task processing is cancelled in the subsequent monitoring time period. In other words, the operation time manager restricts task processing or cancels that restrictation every monitoring time period according to the burden state in the storage system.

According to the present invention, interrupt processing and task processing requested internally or externally can be scheduled in a balanced manner, and accordingly, storage system performance can be improved.

DESCRIPTION OF THE DRAWINGS

FIG. 3 is a diagram illustrating the relationship between task processing and interrupt processing relating to control processing in the storage system.

FIG. 5 is a diagram illustrating an operation time allocation range table.

FIG. 7 is a diagram illustrating a restricted state operation time allocation table.

FIG. 8 is a time chart for each kind of processing during the process of shifting state from the normal state to the restricted state.

FIG. 10 is a chart showing control processing priorities in the restricted states.

DETAILED DESCRIPTION

An embodiment of the present invention will be described with reference to the drawings.

Figure 1:
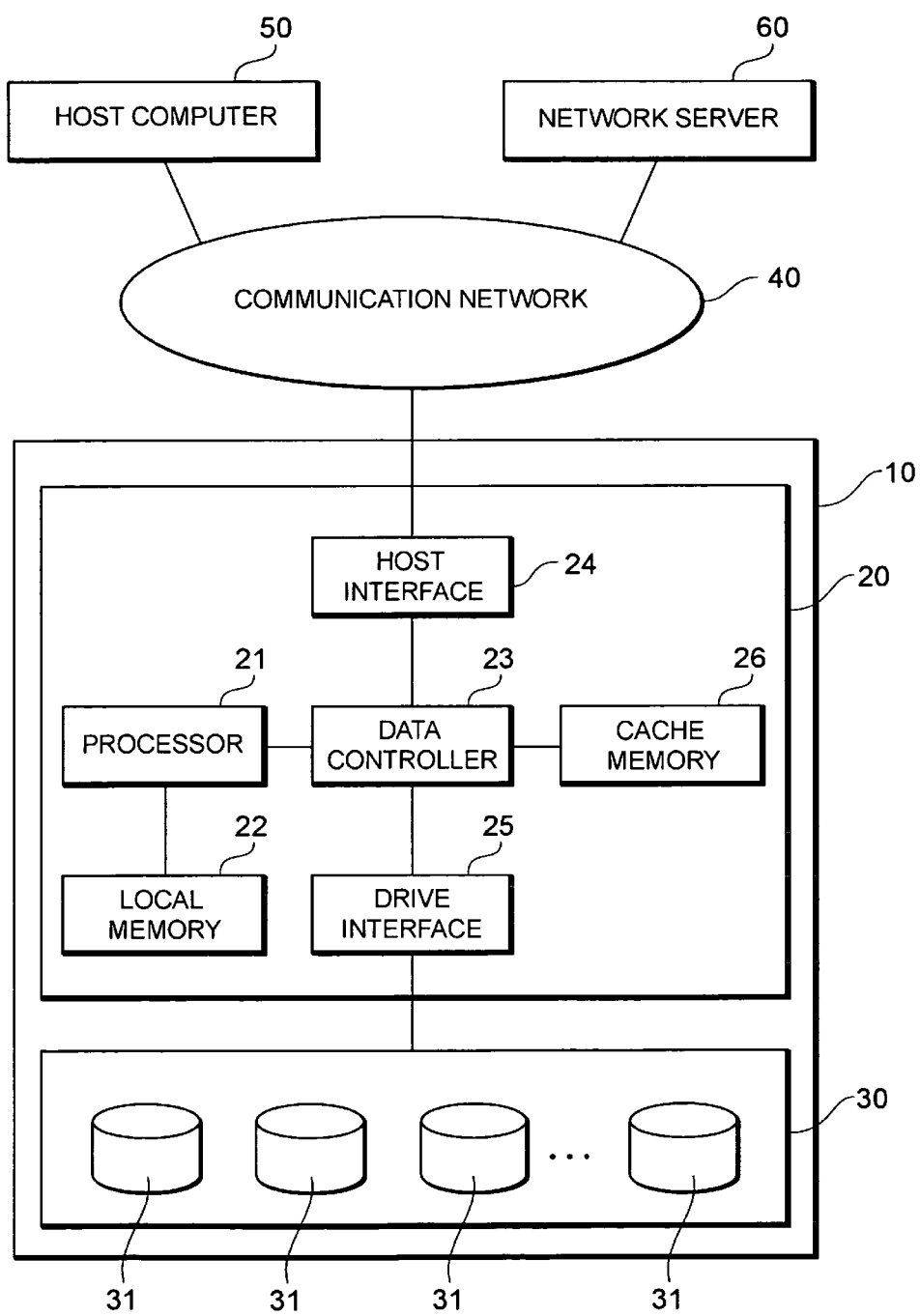
FIG. 1 is a diagram showing the hardware configuration in the storage system according to an embodiment of the present invention.

FIG. 1 shows the main configuration of a storage system 10 according to the present embodiment. The storage system 10 is connected, via a communication network 40, to one or more host computers 50 and one or more network servers 60.

The host computer 50 is a personal computer, workstation, or main frame. Application programs (e.g. web application software, streaming application software, e-business application software) are installed on the host computer 50.

The network server 60 is an SNMP (Simple Network Management Protocol) server for managing a network, an SNTP (Simple Network Time Protocol) server for managing a network time protocol, a backup server for managing backup and restoring, or a scan server for performing virus checks.

The communication network server 40 may be a SAN (Storage Area Network), a LAN (Local Area Network), a WAN (Wide Area Network), the Internet, a dedicated line, or a public line. If the host computer 50 is connected to the storage system 10 via a SAN, the host computer 50 requests data input/output in blocks, which are data management units in storage resources in the storage system 10, according to Fiber Channel Protocol or iSCSI (Internet Small Computer System Interface) Protocol. If the host computer 50 is connected to the storage system 10 via a LAN, the host computer 50 requests data input/output by file by designating a file name according to NFS (Network File System) or CIFS (Common Interface File System) protocol. To receive file access requests from the host computer 50, the storage system 10 has to have a NAS (Network Attached Storage) function.

The storage system 10 is mainly made up with includes a controller 20 and storage device 30.

The storage device 30 includes a plurality of disk drives 31. The disk drives 31 may be various disk drives, such as FC (Fiber Channel) disk drives, SATA (Serial Advanced Technology Attachment) disk drives, PATA (Parallel Advanced Technology Attachment) disk drives, FATA (Fiber Attached Technology Adapted) disk drives, and SCSI (Small Computer System Interface) disk drives.

The controller 20 can control the storage device 30 at a certain RAID level (e.g., 0, 1, or 5) defined in the RAID system. In a RAID group, one or more logical units, being access units for the host computer 50, are defined. An LUN (Logical Unit Number) is allocated to each logical unit.

The controller 20 is mainly made up with a processor 21, local memory 22, data controller 23, host interface 24, drive interface 25, and cache memory 26. The controller 20 is a single processor having one processor 21.

The processor 21 controls I/O processing to/from the storage device 30 in response to data input/output requests from the host computer 50. The local memory 20 stores a microprogram and various tables (operation time allocation range table 800, normal state operation time allocation table 810, and restricted stated operation time allocation table 820 described later) for the processor 21. The cache memory 26 is buffer memory for temporarily storing write data that is to be written to the storage device 30, or read data that has been read from the storage device 30. The cache memory 26 is non-volatile memory that prevents cache data to from being lost even when a power failure occurs in the storage system 10.

The data controller 23 mutually connects a host interface 24, drive interface 25, and cache memory 26, and controls data transfer between the host computer 50 and storage device 30. More specifically, when write access is requested from the host computer 50, the data controller 23 writes write data received via the host interface 24 from the host computer 50, to the cache memory 26. The drive interface 25 writes the write data that has been written to the cache memory 26 to the storage device 30. Meanwhile, when read access is requested from the host computer 50, the data controller 23 writes read data that has been read via the drive interface 25 from the storage device 30, to the cache memory 26, and also transfers the read data to the host interface 24. If the storage device 30 is managed at RAID level "5," the data controller 23 calculates parity data.

The host interface 24 is an interface controller for controlling the interfaces between the host computer 50 and controller 20 and receives a block access request from the host computer 50 according to Fiber Channel Protocol, or a file access request from the host computer 50 according to a protocol of file transfer. The drive interface 25 controls the interface between the controller 20 and storage device 30, and controls data input/output to/from the storage device 30 according to a protocol that controls the storage device 30.

Figure 2:
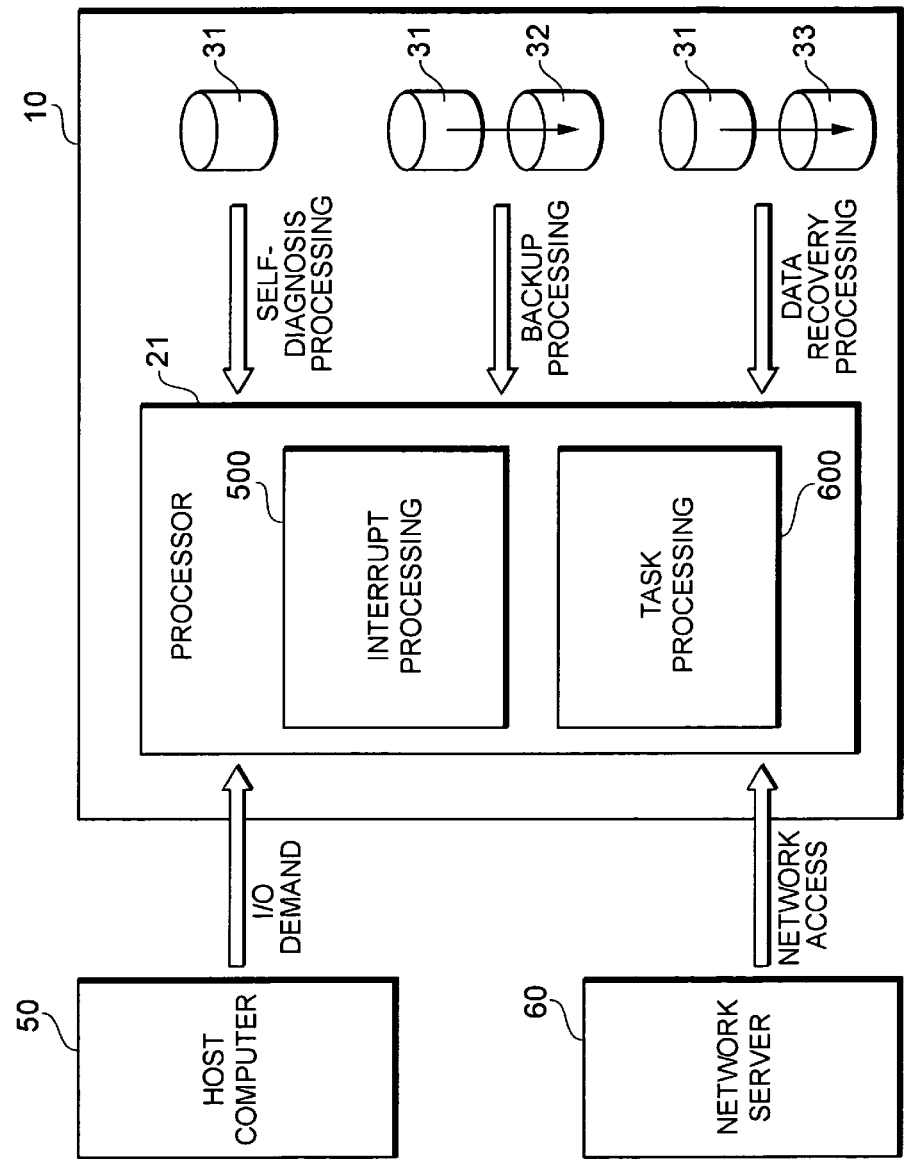
FIG. 2 is a diagram illustrating factors in interrupt processing and task processing requested by a storage system.

FIG. 2 shows factors in interrupt processing 500 and task processing 600 requested from the storage system 10. Processing externally requested of the storage system 10 includes main I/O task processing, main I/O interrupt processing, network task processing, and network interrupt processing. Processing internally requested of the storage system 10 includes monitoring task processing, monitoring interrupt processing, failure task processing, failure interrupt processing, and OS processing.

More specific examples of processing for the storage system 10 requested internally include self-diagnosis processing for checking whether or not a failure is present in the disk drives 31, backup processing for backing up data stored in a disk drive 31 to another disk drive 31, and data recovery processing for recovering data by correcting errors using redundant data, operating the storage system in a degraded mode, and performing correction copy to a spare disk 33.

More specific examples of the processing for the storage system 10 requested externally include an I/O request from the host computer 50 and various processing requests from the network server 60 (e.g. SNMP processing, SNTP processing, backup request processing, and virus check processing).

FIG. 3 shows the relationship between task processing and interrupt processing relating to control processing for the storage system 10. That relationship shows to which processing system (main I/O, monitoring, failure, and OS) each interrupt processing belongs, and to which processing system each task processing belongs. For example, the interruption name "Inter-CTL communication interruption" belongs to the main I/O interrupt processing. The task name "tDFCTL" belongs to the main I/O task processing. Because the details of the task processing and interrupt processing shown in FIG. 3 do not relate to the main feature of the present invention, their descriptions are omitted.

Figure 4:
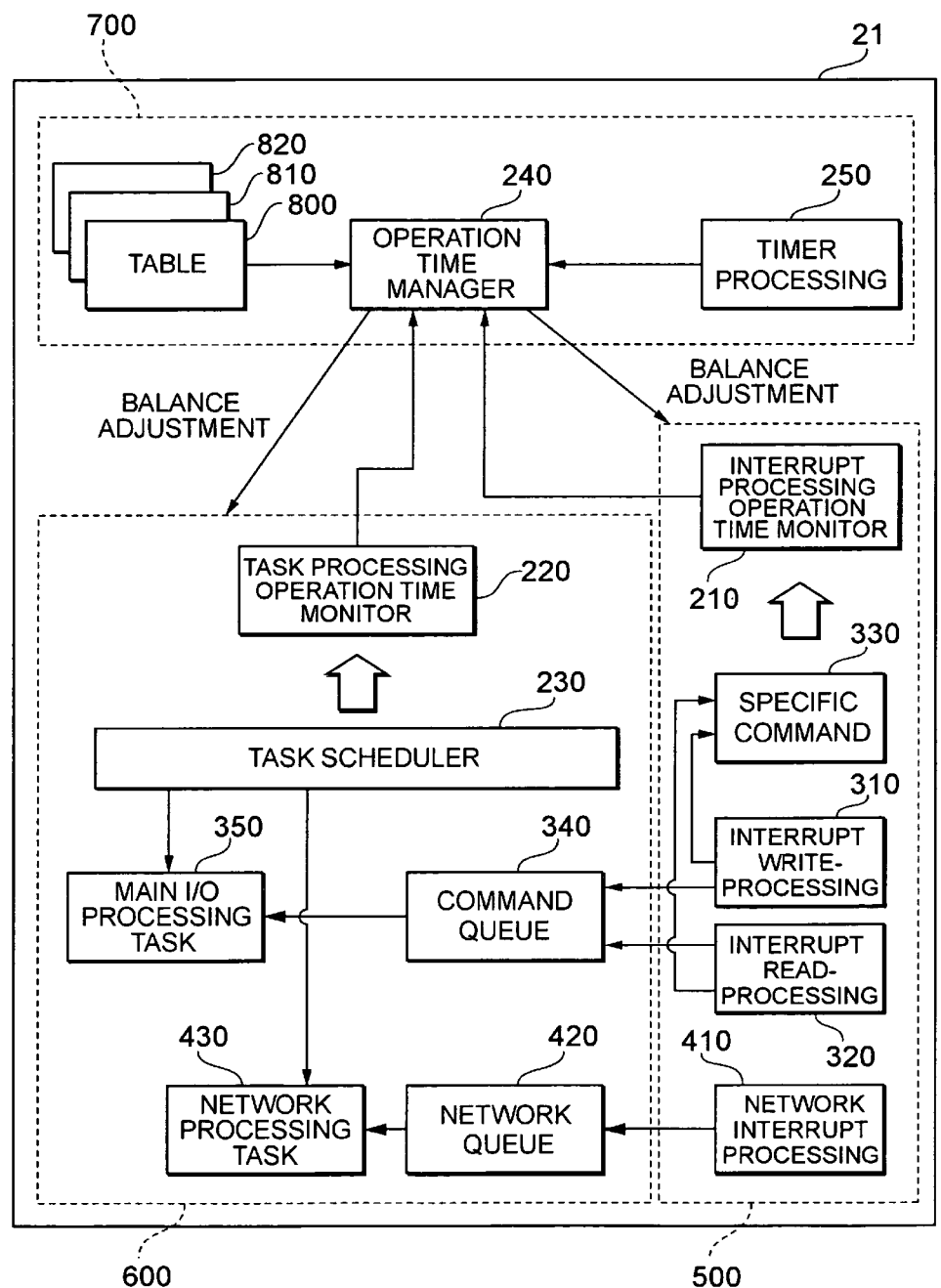
FIG. 4 is a block diagram showing various functions that operate on a processor.

FIG. 4 shows function blocks in various processing executed on the processor 21. On the processor 21, interrupt processing 500, task processing 600, and scheduling processing 700 that are time-divided are executed in a multitasking operating system environment. The interrupt processing 500 is performed at interruption level and is not managed by the task scheduler 230. The task processing 600 is performed at task level and managed by the task scheduler 230. The scheduling processing 700 is performed at timer interruption level and is not managed by the task scheduler 230.

Interrupt write-processing 310 and interrupt read-processing 320 from the host computer 50 of high priority are received as specific commands 330 and have priority. Interrupt write-processing 310 and interrupt read-processing of low priority are registered for a command queue 340 and performed as main I/O processing tasks 350 under the management of the task scheduler 230.

Meanwhile, the network interrupt processing 410 requested from the network server 60 is registered for a network queue 420 and executed as network processing tasks 430 under the management of the task scheduler 230.

The interrupt processing operation time monitor 210 measures the time period (interrupt processing time) for which the processor resources are allocated to the interrupt processing 500. The task processing operation time monitor 22 measures the time period (task processing time) for which the processor resources are allocated to the task processing 600. The operation time manager 240 measures the interrupt processing time and task processing time at the point in time of interruption by timer processing 250. If either processing takes too much time, the balance of the ratio between the interrupt processing time and task processing time is adjusted based on the operation time allocation range table 800, normal state processing time allocation table 810, and restricted state operation time allocation table 820. The timer processing 250 is a process for updating the timer.

The above-described interrupt processing operation time monitor 210, task processing operation time monitor 220, and operation time manager 240 are function modules realized in a multitasking operating system environment.

Next, processing for scheduling various processing (main I/O task processing, main I/O interrupt processing, monitoring task processing, monitoring interrupt processing, network task processing, network interrupt processing, OS processing) while adjusting the balance between the interrupt processing time and task processing time will be described in detail with reference to FIGS. 5 to 14.

FIG. 5 shows the operation time allocation range table 800. In the operation time allocation range table 800, an operation time proportion (percentage) range for each kind of processing (main I/O task processing, main I/O interrupt processing, monitoring task processing, monitoring interrupt processing, network task processing, network interrupt processing, and OS processing) for a certain monitoring time period is set. The operation time proportion range for each kind of processing can be set to an optimum value according to the management form and network environment in the storage system 10. As shown in FIG. 5, each operation time proportion range set in the operation time allocation range table 800 has a certain scope. The "–" mark in the table means no restrictation set for the operation time proportion.

Figure 6:
FIG. 6 is a diagram illustrating a normal state operation time allocation table.

FIG. 6 shows the normal state operation time allocation table 810. In the normal state operation time allocation table 810, a ceiling value for the operation time proportion for each kind of processing in the normal state is set. The ceiling value for the operation time proportion for each kind of processing in the normal state is set within the range set in the operation time allocation range table 800. The "normal state" indicates the state where the operation time is balanced between the interrupt processing 500 and task processing 600.

FIG. 7 shows the restricted state operation time allocation table 820. In the restricted state operation time allocation table 820, a ceiling value for the operation time proportion for each kind of processing in each restricted state is set. The ceiling value for the operation time proportion for each kind of processing in each restricted state is set within the proportion range set in the operation time allocation range table 800. The "restricted state" means the state where the operation time is not balanced between the interrupt processing 500 and task processing 600, and the processing time is restricted. There may be a plurality of restricted states.

FIG. 8 shows a time chart for each kind of processing in the process of shifting state from the normal state to the restricted state. For ease of explanation, a time period from a time T0 to a time T1 is set to "stage 1,", a time period from a time T1 to a time T2 is set to "stage 2," . . . and a time period from a time T5 to a time T6 is set to "stage 6." The time length in each stage is equivalent to that of the above described monitoring time period. The monitoring time consists of a plurality of units of time. The operation time manger 240 regularly checks the proportion of each interrupt processing and task processing in each of stages 1 to 6 at the times T0, T1, . . . and T6 (the end of each stage).

If the proportion of interrupt processing time or task processing time at stage N (N is an integer greater than 0) exceeds the proportion range set in the normal state operation time allocation table 810, the operation time manager 240 restricts the proportion of that interrupt processing time or task processing time at the stage (N+1) based on the proportion set in the "restricted state M" in the restricted state operation time allocation table 820. Only one restricted state applies to the restricted state M based on a combination of processing, the operation time proportion of which exceeds the ceiling value at the end of stage N.

For example, at stage 1 in the normal state, the operation time proportions for the main I/O task processing and main I/O interrupt processing are 80% and 20% respectively. Because those operation time proportions are within the operation proportions set in the normal state operation time allocation table 810, the operation time manager 240 then adjusts the operation time proportion for each kind of processing at stage 2 based on the operation proportions set in the normal state operation time allocation table 810.

At stage 2 in the normal state, the operation time proportions for the main I/O task processing and main I/O interrupt processing are 20% and 80% respectively. Because the operation time for the main I/O interrupt processing exceeds its 40% ceiling value, the operation time manager 240 adjusts the operation time proportion for each kind of processing at the stage 3 based on the "restricted state 8" set in the restricted state operation time allocation table 820.

At stage 3 in the restricted state 8, the operation time manager 240 restricts the operation time proportion for the main I/O interrupt processing to 40%. However, the operation time proportion for the network interrupt processing time at stage 3 is 30%, which exceeds the proportion (10%) set in the normal state operation time allocation table 810. Accordingly, the operation time manager 240 adjusts the operation time proportion for each kind of processing at stage 4 based on the operation time proportions set for the "restricted state 9" in the restricted state operation time allocation table 820.

After that, the operation time manager 240 adjusts the operation time proportion for each kind of processing at stages 4, 5, and 6 in the same manner.

Figure 9:
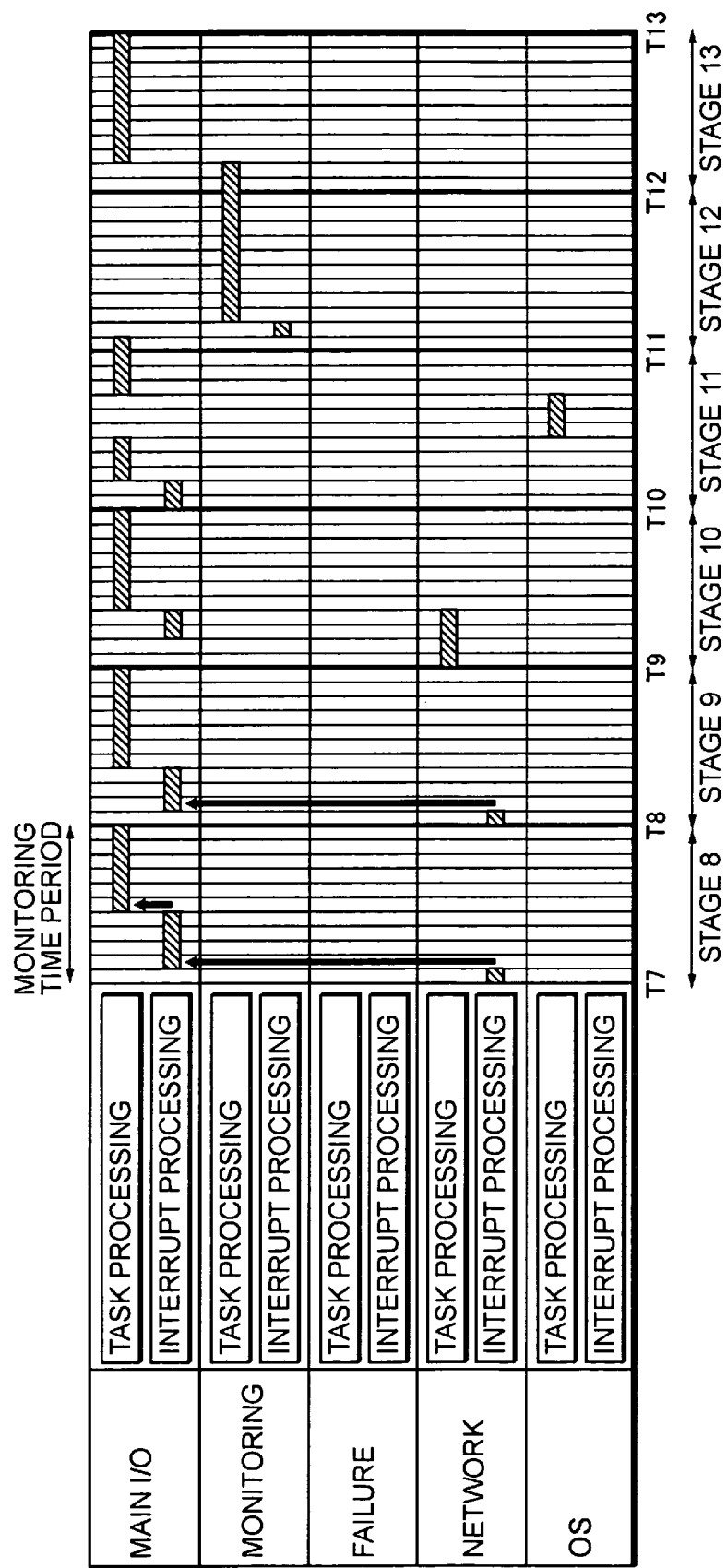
FIG. 9 is a time chart for each kind of processing during the process of shifting state from the restricted state to the normal state.

FIG. 9 shows a time chart for each kind of processing in the process of shifting state from restricted state to normal state. For ease of explanation, a time period from time T7 to time T8 is set to "stage 8," a time period from time T8 to time T9 is set to "stage 9," . . . and a time period from time T12 to time T13 is set to "stage 13." The time length in each of stages 8 to 13 is equivalent to the above described monitoring time period. The operation time manager 240 regularly checks the proportions for the interrupt processing time and task processing time during each stage at the times T7, T8, . . . and T13 (at the end of each stage).

At stage 8 in the restricted state 9, the operation time manager 240 restricts the operation time proportion for the main I/O interrupt processing to 40% and that for the network interrupt processing to 10%. Because the operation time proportions for both the main I/O interrupt processing and network interrupt processing are at their ceiling values, the operation time manager 240 adjusts the operation time proportion for each kind of processing at stage 9 based on the operation time proportions set in the restricted state operation time allocation table 820.

At stage 9 in the restricted state 9, the operation time proportion for the network interrupt processing is still at its 10% ceiling value, but the operation time proportion for the main I/O interrupt processing is reduced to 30%, which is lower than its 40% ceiling value. Accordingly, the operation time manager 240 adjusts the operation time proportion for each kind of processing at stage 10 based on the operation time proportion set for the "restricted state 1" in the restricted state operation time proportion table 820.

At stage 10 in the restricted state 1, the operation time proportion for the network processing is reduced to 0%, which is lower than its 10% ceiling value, and the operation time proportion for the main I/O interrupt processing is reduced to 20%, which is lower than its 40% ceiling value. Accordingly, the operation time manager 240 cancels the restricted state and adjusts the operation time proportion for each kind of processing at stage 11 based on the operation time proportions set in the normal state operation time allocation table 810.

After that, the operation time manager 240 adjusts the operation time proportion for each kind of processing at stages 11, 12, and 13 in the same manner.

In the above described restricted states, not only is the operation time proportion for each kind of processing adjusted, but the control processing of high priority in main I/O, monitoring, failure, network, and OS processing may also take priority as shown in FIG. 10. In FIG. 10, the "o" mark indicates high priority, and the "x" mark indicates low priority.

Figure 11:
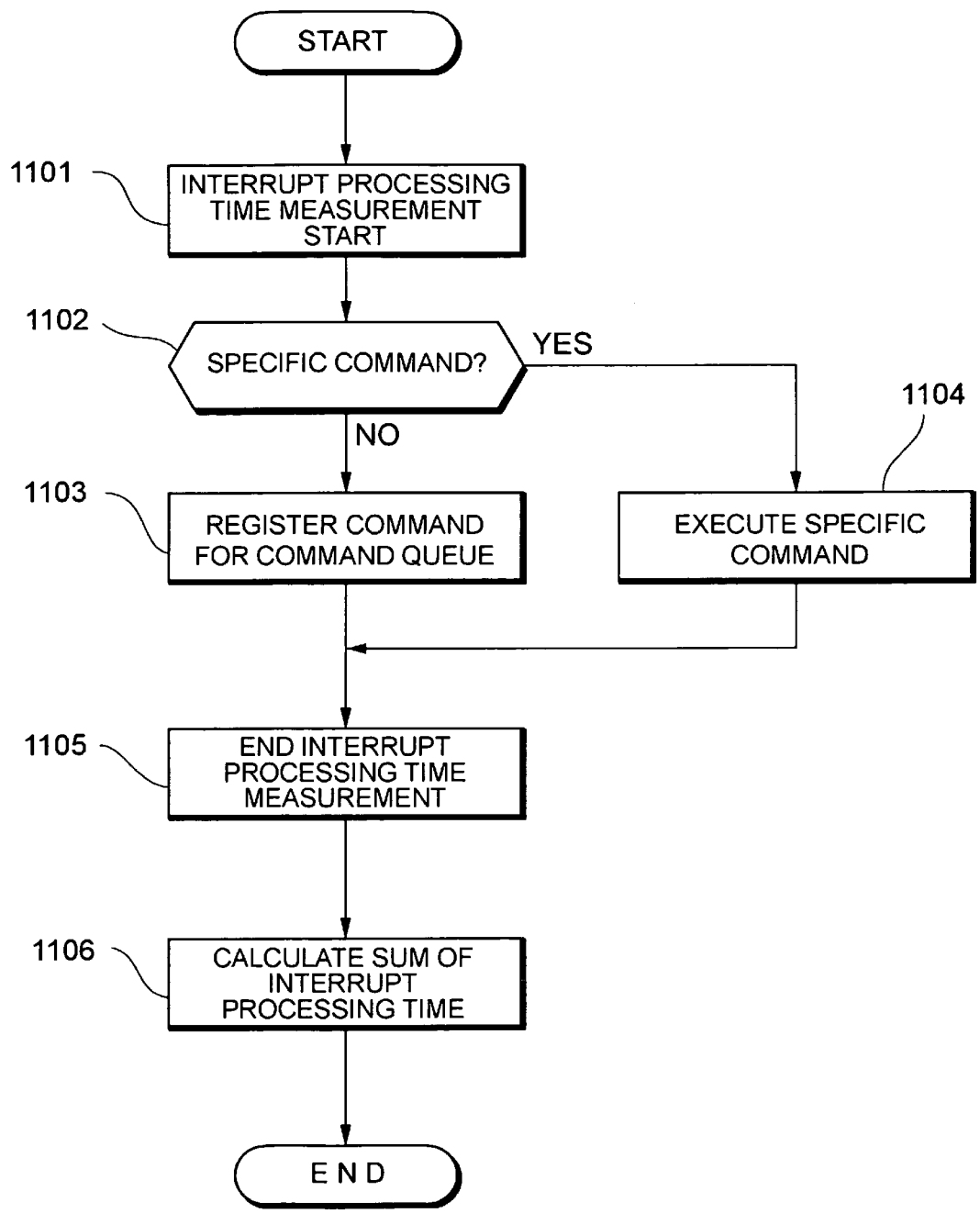
FIG. 11 is a flowchart illustrating interrupt processing time measurement processing.

FIG. 11 is a flowchart illustrating interrupt processing time measurement processing. The interrupt processing time measurement processing is processing for calculating the total value of interrupt processing time at each stage, and is executed in an event-driven manner when an interrupt processing request to the storage system 10 is received. Sometimes the interrupt processing time measurement processing is performed several times during one stage.

When receiving an interrupt request, the interrupt processing operation time monitor 210 starts the interrupt processing time measurement (step 1101).

If that interrupt request has been made for a specific command (step 1102; YES), the processor 21 promptly executes the specific command (step 1104).

If that interrupt request has not been made for a specific command (step 1102; NO), the processor 21 temporarily registers that interrupt request for the command queue 340 (step 1103).

Next, the interrupt processing operation monitor 210 ends the interrupt processing time measurement (step 1105), and adds the interrupt processing time measured in the steps 1101 to 1105 to the measurement result for the previous interrupt processing time measurement processing (step 1106).

Figure 12:
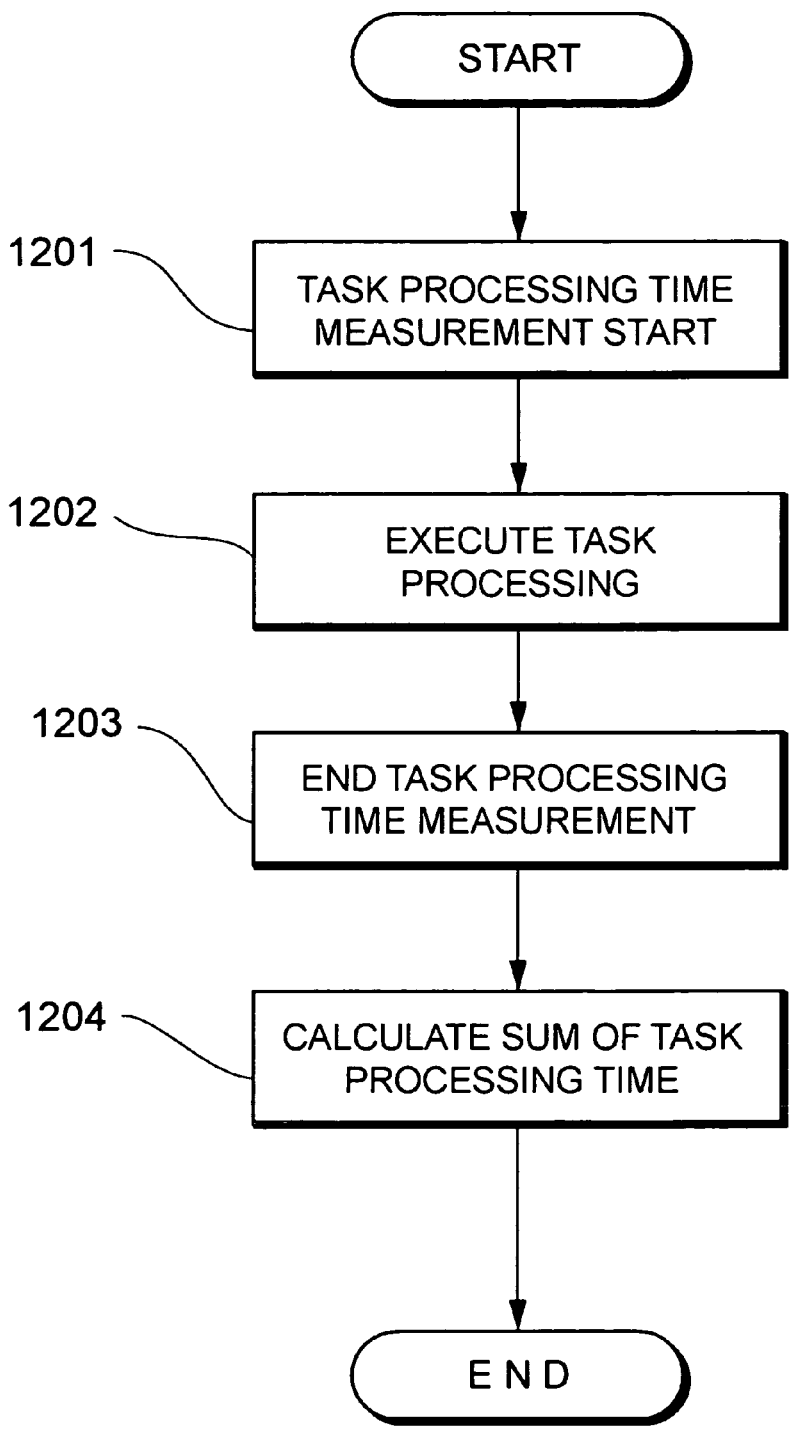
FIG. 12 is a flowchart illustrating task processing time measurement processing.

FIG. 12 is a flowchart illustrating task processing time measurement processing. The task processing time measurement processing is processing for calculating the total value of task processing time at each stage, and is performed in an event driven manner when the task processing is performed. Sometimes the task processing time measurement processing is performed several times during one stage.

When task processing is called by the task scheduler 230, the task processing operation time monitor 220 starts the task processing time measurement (step 1201).

After the task processing is executed by the processor 21 (step 1202), the task processing operation time monitor 220 ends the task processing time measurement (step 1203) and adds the task processing time measured in the steps 1201 to 1203 to the measurement result for the previous task processing time measurement processing (step 1106).

Figure 13:
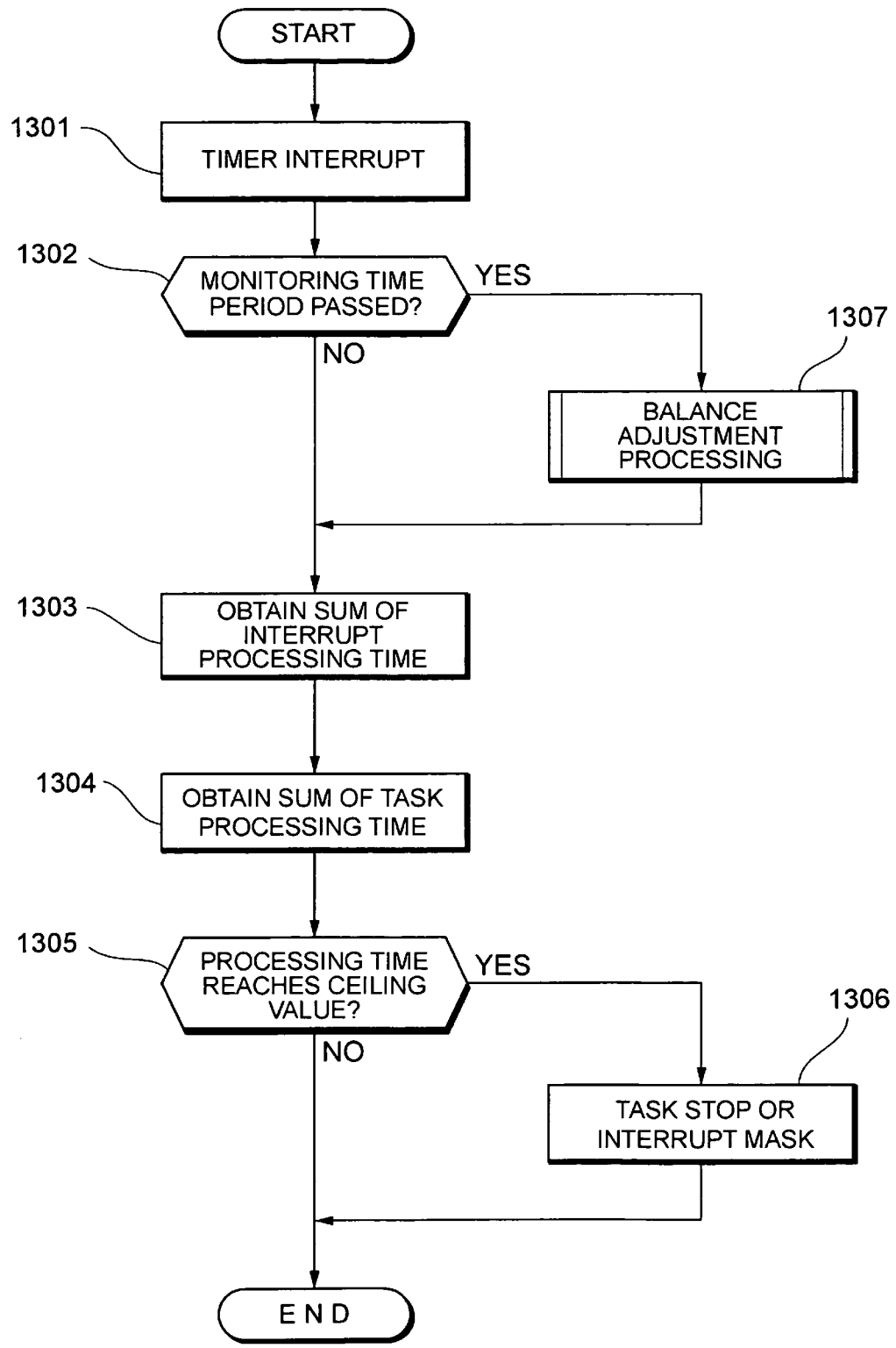
FIG. 13 is a flowchart illustrating the scheduling processing.

FIG. 13 is a flowchart illustrating scheduling processing. The scheduling processing is processing for adjusting the balance between the interrupt processing time and task processing time at each stage based on the above described normal state operation time allocation table 810 and restricted state operation time allocation table 820. Though details for the scheduling processing have been described referring to the time charts (FIGS. 8 and 9), they are described here again with reference to the flowchart. The scheduling processing is performed when timer interruption of the timer processing 250 is received. Timer interruption occurs once per unit time. For example, if the monitoring time period consists of 100 time units, the timer interruption occurs 100 times per stage.

Steps 1301 to 1306 described later are executed once per unit time (for example, those steps are executed 100 times per stage). A step 1307 described later is executed once per monitoring time period (i.e., at the end of each stage).

When receiving timer interruption (step 1301), the operation time manager unit 240 checks whether or not a monitoring time period has passed (i.e., whether or not it is at the end of each stage) (step 1302). If a monitoring time period has passed (step 1302; YES), the operation time manager 240 executes balance adjustment processing (step 1307). The balance adjustment processing will be described later in detail.

If a monitoring time period has not passed (step 1302; NO), the operation time manager 240 obtains the total value of the interrupt processing time in the monitoring time period from the interrupt processing operation time monitor 210 (step 1303), and obtains the total value of the task processing time in the monitoring time period from the task processing operation time monitor 220 (step 1304).

When the interrupt processing time or task processing time reaches its ceiling value (the ceiling value set in the restricted state operation time allocation table 820) (step 1305; YES), the operation time manager 240 stops the task processing or masks the interrupt processing (step 1306). If neither the interrupt processing time nor task processing time reaches its ceiling value (step 1305; NO), the scheduling processing ends.

Figure 14:
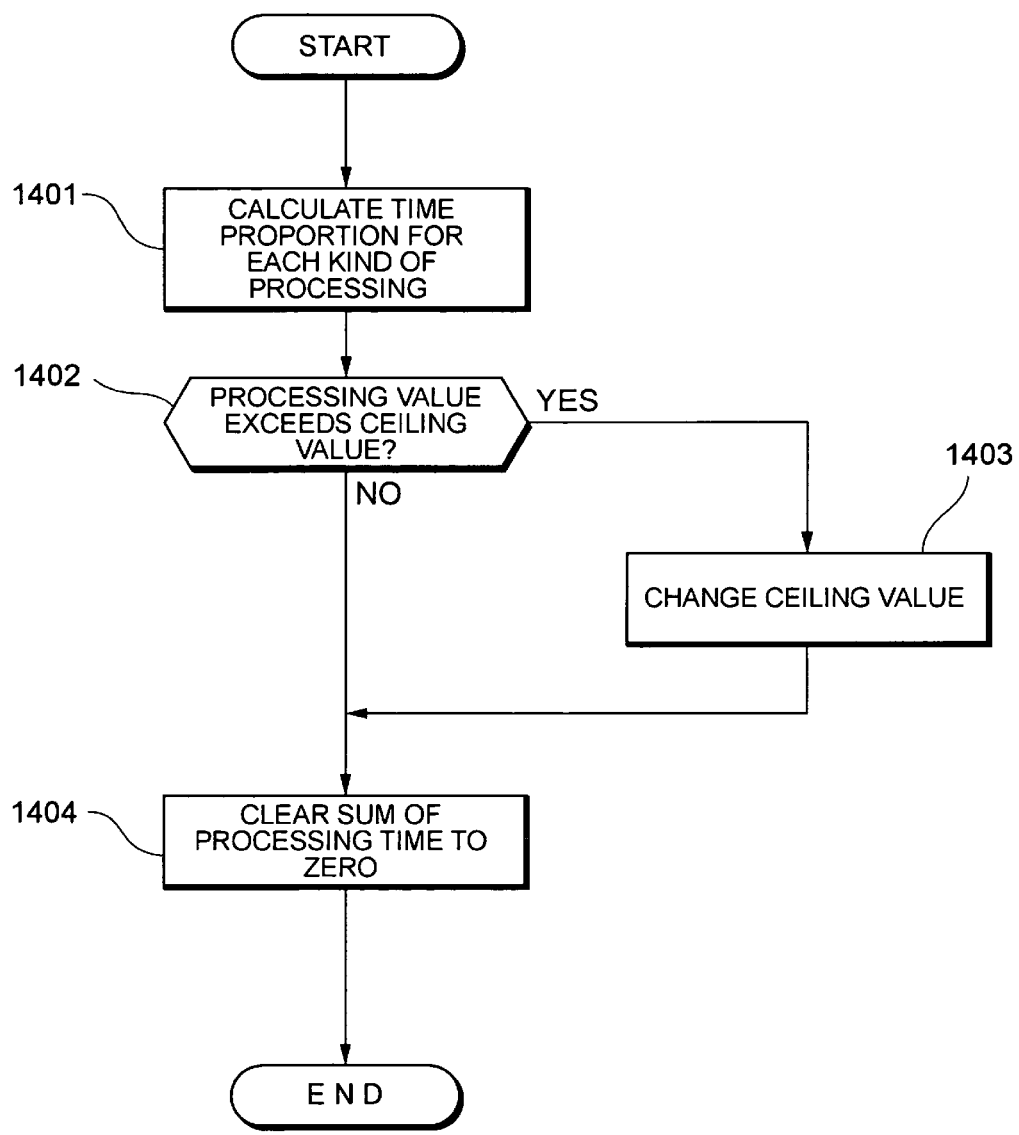
FIG. 14 is a flowchart illustrating balance adjustment processing.

FIG. 14 is a flowchart illustrating balance adjustment processing. Balance adjustment processing is a subroutine that is called and executed when a monitoring time period has passed (at the end of each stage).

The operation time manager 240 calculates the proportions for the interrupt processing time and task processing time that occupy the monitoring time period (step 1401), and checks whether or not the proportion for the interrupt processing time or task processing time exceeds its ceiling value (step 1402).

If the proportion for the interrupt processing time or the task processing time exceeds its ceiling value (step 1402;

YES), the operation time manager 240 sets the ceiling value of the proportion for the interrupt processing time or task processing time to the value set in the corresponding restricted state (step 1403).

If neither the proportion for the interrupt processing time nor the task processing time exceeds its ceiling value (step 1402; NO), or after the balance adjustment processing (step 1403) is executed, the operation time manager 240 clears the total interrupt processing time value and the total task processing time value in the monitoring time period to zero (step 1404).

According to the present embodiment, the interrupt processing 500 and task processing 600 requested of the storage system 10 internally and externally are scheduled in a balanced manner. Accordingly, even if high priority interrupt processing frequently occurs, the processor resources are not unequally allocated only to the interrupt processing. In other words, the processor resources are allocated to both the interrupt processing 500 and task processing 600 in a balanced manner according to the state of the burden on the storage system 10 and its usage.

What is claimed is:

1. A storage system having a single processor that operates in a multitasking operation system environment, the storage system comprising:
    an operation time manager that, when a processing time proportion for an interrupt processing, for which both an internal request and an external request are made to the storage system, in a first processing monitoring time period is not within a first threshold range, changes the first threshold range to a second threshold range which is lower than the first threshold range to restrict an allowable interrupt processing time proportion in a second processing monitoring time period which is subsequent to the first processing monitoring time period;
    wherein the operation time manager, when the processing time proportion for the interrupt processing in the second processing monitoring time period is within the first threshold range, changes the second threshold range to the first threshold range in a third processing monitoring time period which is subsequent to the second processing time period; and
    wherein when a processing time proportion for a task processing, for which both an internal request and an external request are made to the storage system, in the first processing monitoring time period is not within a third threshold range, the operation time manager changes the third threshold range to a fourth threshold range which is lower than the third threshold range to restrict an allowable task processing time proportion in the second processing monitoring time period; and when the task processing proportion in the second processing monitoring time period is within the third threshold range, the operation time manager changes the fourth threshold range to the third threshold range in the third processing monitoring time period.

2. The storage system according to claim 1, wherein the interrupt processing and task processing requested of the storage system externally include a processing relating to main I/O or a network.

3. The storage system according to claim 1, wherein the interrupt processing and task processing requested of the storage system internally and externally include a processing relating to monitoring or failure.

4. A storage system having a single processor that operates a multitasking operation system, the storage system comprising:
    an interrupt processing operation time monitor for regularly measuring interrupt processing time in fixed processing monitoring time periods;
    an operation time manager that, when a processing time proportion for an interrupt processing, for which both an internal request and an external request are made to the storage system, in a first processing monitoring time period is not within a first threshold range, changes the first threshold range to a second threshold range which is lower than the first threshold range to restrict an allowable interrupt processing time proportion in a second processing monitoring time period which is subsequent to the first processing monitoring time period,
    wherein the operation time manager, when the processing time proportion for the interrupt processing in the second processing monitoring time period is within the first threshold range, changes the second threshold range to the first threshold range in a third processing monitoring time period which is subsequent to the second processing monitoring time period, and
    wherein when a processing time proportion for a task processing, for which both an internal request and an external request are made to the storage system, in the first processing monitoring time period is not within a third threshold range, the operation time manager changes the third threshold range to a fourth threshold range which is lower than the third threshold range to restrict an allowable task processing time proportion in the second processing monitoring time period; and when the task processing proportion in the second processing monitoring time period is within the third threshold range, the operation time manager changes the fourth threshold range to the third threshold range in the third processing monitoring time period.

5. A method for scheduling interrupt processing requested, internally and externally, of a storage system in a multitasking operating system environment that operates on a single processor, the method comprising the steps of:
    regularly measuring interrupt processing time in fixed processing monitoring time periods;
    when a processing time proportion for an interrupt processing, for which both an internal request and an external request are made to the storage system, in a first processing monitoring time period is not within a first threshold range, changing the first threshold range to a second threshold range which is lower than the first threshold range to restrict an allowable interrupt processing time proportion in a second processing monitoring time period which is subsequent to the first processing monitoring time period;
    when the processing time proportion for the interrupt processing in the second processing monitoring time period is within the first threshold range, changing the second threshold range to the first threshold range in a third processing monitoring time period which is subsequent to the second processing monitoring time period;

when a processing time proportion for a task processing, for which both an internal request and an external request are made to the storage system, in the first processing monitoring time period is not within a third threshold range, changing the third threshold range to a fourth threshold range which is lower than the third threshold range to restrict an allowable task processing in the second processing monitoring time period; and when the task processing proportion in the second processing monitoring time period is within the third threshold range, changing the fourth threshold range to the third threshold range in the third processing monitoring time period.

* * * * *